(12) United States Patent
Bi et al.

(10) Patent No.: US 11,200,649 B2
(45) Date of Patent: Dec. 14, 2021

(54) IMAGE PROCESSING METHOD AND APPARATUS, DISPLAY DEVICE, AND COMPUTER READABLE STORAGE MEDIUM

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Haifeng Bi, Beijing (CN); Xin Wang, Beijing (CN); Yan Fang, Beijing (CN); Wenke Li, Beijing (CN); Yufeng Bao, Beijing (CN); Bailing Liu, Beijing (CN); Shun Zhao, Beijing (CN); Lifeng Chen, Beijing (CN)

(73) Assignees: ORDOS YUANSHENG OPTOELECTRONICS CO., LTD., Ordos (CN); BOE TECHNOLOGY GROUP CO., LTD., Beijing (CN)

(*) Notice: Subject to any disclaimer, the term of this patent is extended or adjusted under 35 U.S.C. 154(b) by 208 days.

(21) Appl. No.: 16/465,810

(22) PCT Filed: Nov. 19, 2018

(86) PCT No.: PCT/CN2018/116078
§ 371 (c)(1),
(2) Date: May 31, 2019

(87) PCT Pub. No.: WO2019/184393
PCT Pub. Date: Oct. 3, 2019

(65) Prior Publication Data
US 2021/0097658 A1    Apr. 1, 2021

(30) Foreign Application Priority Data
Mar. 30, 2018   (CN) .......................... 201810288908.5

(51) Int. Cl.
*G06T 5/50* (2006.01)
*G06T 7/246* (2017.01)
(Continued)

(52) U.S. Cl.
CPC .................. *G06T 5/50* (2013.01); *G06K 9/46* (2013.01); *G06T 5/003* (2013.01); *G06T 7/246* (2017.01);
(Continued)

(58) Field of Classification Search
None
See application file for complete search history.

(56) References Cited

U.S. PATENT DOCUMENTS

2002/0067464 A1   6/2002   Werner
2006/0146197 A1   7/2006   Goh
(Continued)

FOREIGN PATENT DOCUMENTS

CN    101105915 A    1/2008
CN    101727815 A    6/2010
(Continued)

OTHER PUBLICATIONS

First Office Action for Chinese Application No. 201810288908.5, dated Oct. 8, 2019, 8 Pages.
(Continued)

*Primary Examiner* — Leon Viet Q Nguyen
(74) *Attorney, Agent, or Firm* — Brooks Kushman P.C.

(57) ABSTRACT

An image processing method provided by embodiments of the present disclosure includes acquiring, two adjacent frames of original images from a video image data stream; extracting a feature element that produces smear from the two adjacent frames of the original images; generating a reconstructed image frame that does not comprise the feature element by using the two adjacent frames of the original
(Continued)

images and the feature element; and inserting the reconstructed image frame between the two adjacent frames of the original images.

18 Claims, 7 Drawing Sheets

(51) Int. Cl.
*G06K 9/46* (2006.01)
*G06T 5/00* (2006.01)

(52) U.S. Cl.
CPC ............ *G06T 2207/10016* (2013.01); *G06T 2207/20036* (2013.01); *G06T 2207/30241* (2013.01)

(56) References Cited

U.S. PATENT DOCUMENTS

| | | | | |
|---|---|---|---|---|
| 2007/0070221 | A1* | 3/2007 | Nishi | H04N 7/0132 348/241 |
| 2007/0071346 | A1* | 3/2007 | Li | G06T 5/003 382/254 |
| 2009/0002554 | A1* | 1/2009 | Kim | H04N 9/3155 348/513 |
| 2009/0010565 | A1 | 1/2009 | Hsieh et al. | |
| 2011/0013068 | A1 | 1/2011 | Shibasaki | |
| 2011/0148947 | A1 | 6/2011 | Chen et al. | |
| 2018/0181196 | A1* | 6/2018 | Lee | H04N 5/225251 |

FOREIGN PATENT DOCUMENTS

| | | |
|---|---|---|
| CN | 102007760 A | 4/2011 |
| CN | 102110403 A | 6/2011 |
| CN | 102252536 A | 11/2011 |
| CN | 102333200 A | 1/2012 |
| CN | 102595022 A | 7/2012 |
| CN | 105635805 A | 6/2016 |
| CN | 106373537 A | 2/2017 |
| CN | 108574794 A | 9/2018 |
| TW | I336202 B | 1/2011 |

OTHER PUBLICATIONS

International Search Report and Written Opinion for Application No. PCT/CN2018/116078, dated Feb. 12, 2019, 11 Pages.
Fang et al., "Technology Research on Solving the Dynamic LCD Images Smearing," Journal of Gansu Lianhe University (Natural Sciences), Mar. 2012, pp. 53-55, vol. 26, No. 2 (3 Pages).
Chen, Wei, "Research and Implementation of Motion Estimation and Compensation Frame Interpolation Technology on LCD Motion Picture," China Masters' Theses Full-text Database, Mar. 31, 2012, China Academic Journal (CD) Electronic Journals Publishing House Co., Ltd. (48 Pages).

* cited by examiner

IMAGE PROCESSING METHOD AND APPARATUS, DISPLAY DEVICE, AND COMPUTER READABLE STORAGE MEDIUM

CROSS-REFERENCE TO RELATED APPLICATIONS

This application is the U.S. national phase of PCT Application No. PCT/CN2018/116078 filed on Nov. 19, 2018, which claims priority to Chinese Patent Application No. 201810288908.5 filed on Mar. 30, 2018, which are incorporated herein by reference in their entireties.

TECHNICAL FIELD

The present disclosure relates to the field of display technology, in particular to an image processing method, an image processing apparatus, a display device, and a computed readable storage medium.

BACKGROUND

In the current display field, thin film transistor-liquid crystal displays (TFT-LCDs) have been rapidly developed due to their high resolution, high definition, and high brightness as compared to conventional cathode ray tube (CRT) displays. However, the appearance of smear and blurring on the LCD when displaying moving images is often criticized. After a lot of research, it has been found that causes of the generation of the smear of the moving images on the LCD mainly include three aspects: liquid crystal response speed, persistence characteristics of liquid crystal display, and afterglow effect of human vision. In a virtual reality (VR) head-mounted display device, the afterglow effect may cause a feeling of dizziness, but when displaying with low afterglow, a trajectory of an object when a wearer's head moves is closer to a real trajectory in the physical world, and then the smear caused by the head movement will be greatly reduced.

SUMMARY

In a first aspect, the present disclosure provides an image processing method, which includes: acquiring multiple frames of original images from a video image data stream; extracting a feature element that produces smear from the multiple frames of original images; generating a reconstructed image frame that does not include the feature element by using the multiple frames of original images and the feature element; and inserting the reconstructed image frame between two adjacent frames in the multiple frames of original images.

According to some embodiments of the present disclosure, the multiple frames of original images are two adjacent frames of original images.

According to some embodiments of the present disclosure, the feature element includes a moving object and its moving trajectory.

According to some embodiments of the present disclosure, prior to the extracting the feature element that produces the smear from the multiple frames of original images, the method further includes: performing a sharpening and filtering process on the multiple frames of original images.

According to some embodiments of the present disclosure, the extracting the feature element that produces the smear from the multiple frames of original images includes: performing two subtraction logic operations on an original image of a preceding frame $F_{(n-1)}$ and an original image of a subsequent frame $F_{(n+1)}$ by subtracting one from the other to obtain $F_{(a)}$ and $F_{(b)}$, respectively; performing a logic operation of adding $F_{(a)}$ and $F_{(b)}$ to obtain $F_{(c)}$; and performing morphological dilation and erosion operation processes on $F_{(c)}$ to obtain the feature element $F'_{(n)}$ which produces the smear.

According to some embodiments of the present disclosure, the dilation operation process is to perform an operation of "widening" or "thickening" in an image, and the erosion operation process is to perform an operation of "shrinking" or "thinning" in the image.

According to some embodiments of the present disclosure, the generating the reconstructed image frame by using the multiple frames of original images and the feature element includes: performing a logic operation of subtracting $F'_{(n)}$ from $F_{(n-1)}$ to obtain $F'_{(n-1)}$; performing a logic operation of subtracting $F'_{(n)}$ from $F_{(n+1)}$ to obtain $F'_{(n+1)}$; and comparing data of $F'_{(n-1)}$ with that of $F'_{(n+1)}$ to obtain the reconstructed image frame $F_{(n)}$.

According to some embodiments of the present disclosure, the comparing the data of $F'_{(n-1)}$ with that of $F'_{(n+1)}$ to obtain the reconstructed image frame $F_{(n)}$ includes comparing brightness of each pixel in $F'_{(n-1)}$ with that of each corresponding pixel in $F'_{(n+1)}$ to retain data of the pixels with low brightness and remove data of the pixels with high brightness; and generating the reconstructed image frame $F_{(n)}$ by using the retained data of the pixels.

According to some embodiments of the present disclosure, the inserting the reconstructed image frame between the two adjacent frames in the multiple frames of original images includes inserting the reconstructed image frame between the two adjacent frames in the multiple frames of original images after performing a frequency doubling process on the video image data stream.

In a second aspect, the present disclosure further provides an image processing apparatus that includes: an acquiring module configured to acquire multiple frames of original images from a video image data stream; an extracting module configured to extract a feature element that produces smear from the multiple frames of original images; a reconstructing module configured to generate a reconstructed image frame that does not include the feature element by using the multiple frames of original images and the feature element; and an inserting module configured to insert the reconstructed image frame between two adjacent frames in the multiple frames of original images.

According to some embodiments of the present disclosure, the multiple frames of original images are two adjacent frames.

According to some embodiments of the present disclosure, the feature element includes a moving object and its moving trajectory.

According to some embodiments of the present disclosure, the image processing apparatus further includes a pre-processing module configured to perform a sharpening and filtering process on the multiple frames of original images prior to extracting the feature element that produces the smear from the multiple frames of original images.

According to some embodiments of the present disclosure, the extracting module is specifically configured to perform two subtraction logic operations on an original image of a preceding frame $F_{(n-1)}$ and an original image of a subsequent frame $F_{(n+1)}$ by subtracting one from the other to obtain $F_{(a)}$ and $F_{(b)}$, respectively; to perform a logic operation of adding $F_{(a)}$ and $F_{(b)}$ to obtain $F_{(c)}$; and to perform morphological dilation and erosion operation processes on $F_{(c)}$ to obtain the feature element $F'_{(n)}$ which produces the smear.

According to some embodiments of the present disclosure, the dilation operation process is to perform an operation of "widening" or "thickening" in an image, and the erosion operation process is to perform an operation of "shrinking" or "thinning" in the image.

According to some embodiments of the present disclosure, the reconstructing module includes: a logic operation unit configured to perform a logic operation of subtracting $F'_{(n)}$ from $F_{(n-1)}$ to obtain $F'_{(n-1)}$ and to perform a logic operation of subtracting $F'_{(n)}$ from $F_{(n+1)}$ to obtain $F'_{(n+1)}$; and a comparing unit configured to compare data of $F'_{(n-1)}$ with that of $F'_{(n+1)}$ to obtain the reconstructed image frame $F_{(n)}$.

According to some embodiments of the present disclosure, the comparing unit is specifically configured to compare brightness of each pixel in $F'_{(n-1)}$ with that of each corresponding pixel in $F'_{(n+1)}$ to retain data of the pixels with low brightness and remove data of the pixels with high brightness; and to generate the reconstructed image frame $F_{(n)}$ by using the retained data of the pixels.

According to some embodiments of the present disclosure, the inserting module is specifically configured to insert the reconstructed image frame between the two adjacent frames in the multiple frames of original images after performing a frequency doubling process on the video image data stream.

In a third aspect, the present disclosure further provides a display device that includes a memory, a processor, and a computer program stored on the memory and operable on the processor; wherein the processor implements steps in the image processing method as described in the first aspect while executing the program.

According to some embodiments of the present disclosure, the display device is a virtual reality head-mounted device.

In a fourth aspect, the present disclosure further provides a computer readable storage medium having stored a computer program thereon, wherein steps in the image processing method as described in the first aspect are implemented when the program is executed by a processor.

BRIEF DESCRIPTION OF THE DRAWINGS

In order to illustrate the technical solutions of embodiments of the present disclosure, accompanying drawings desired for the embodiments of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

To make the technical problems to be solved, technical solutions and advantages of the present disclosure more apparent, detailed description will be given hereinafter in conjunction with the drawings and specific embodiments.

When a liquid crystal response speed is slow, the severity of smear depends mainly on a response speed of a liquid crystal driving circuit, and when the response speed of the liquid crystal driving circuit is raised to a higher level, the smear is mainly determined by persistence characteristics of the LCD. The problem that the response speed of the liquid crystal driving circuit is not fast enough can be basically solved by OverDrive technology, but due to the afterglow effect of vision of human eyes, the smear of the liquid crystal device still exists even if the response time of 0 ms is reached.

There are several methods that are currently used to solve the problem of image persistence characteristics, for example, black frame insertion (including blacking for backlight and black frame insertion for displaying), backlight scanning, inverse filtering, motion estimation and compensation frame insertion technologies, etc. Among them, both the blacking for backlight (backlight flickering) and the backlight scanning are methods for emulating or partially implementing pulse display in an LCD hold mode. These methods can effectively improve the smear, but brightness loss of the LCD is too large. Both technologies of the black frame insertion for displaying and the motion estimation and compensation frame insertion involve inserting one fully black intermediate frame between every two frames, and double a frame frequency, thereby shortening the LCD persistence time from the perspective of signal processing. However, their algorithms are complicated and will increase requirements for a data rate and bandwidth. In addition, the inverse filtering technology improves the smear by analyzing spatial frequencies, filtering information components with high spatial frequencies (e.g. motion details) in the image and leaving information components with low spatial frequencies (e.g. contours of moving objects) in the image to be perceived by a viewer. However, this method also has problems such as complicated algorithms, noise, and image flickering.

To solve the above technical problems, embodiments of the present disclosure provide an image processing method, an image processing apparatus, a display device, and a computer readable storage medium, which are capable of completely or partially eliminating smear and achieving display with relatively low afterglow, and which include relatively simple algorithms that are easy to implement.

Figure 1:
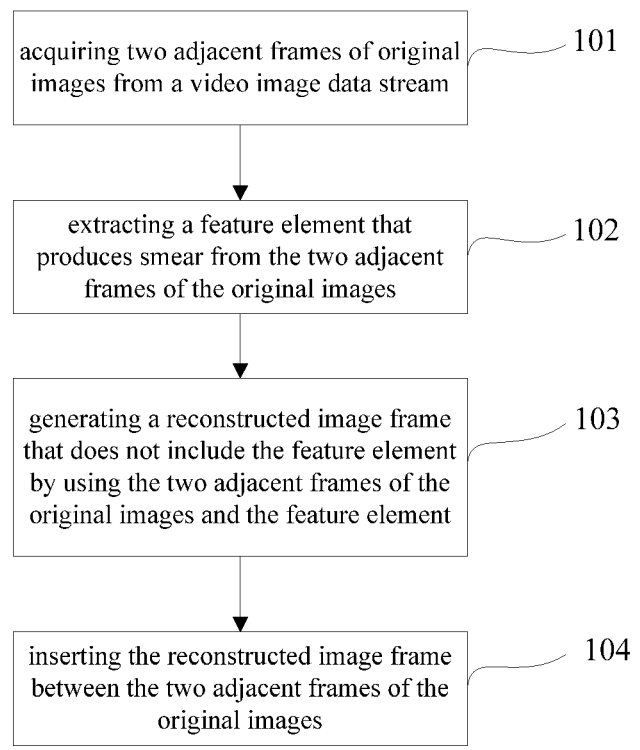
FIG. 1 is a schematic diagram showing a flow chart of an image processing method according to an embodiment of the present disclosure.

Some embodiments of the present disclosure provide an image processing method as shown in FIG. 1, which includes:

Step 101: acquiring two adjacent frames of original images from a video image data stream;

Step 102: extracting a feature element that produces smear from the two adjacent frames of the original images;

Step 103: generating a reconstructed image frame that does not include the feature element by using the two adjacent frames of the original images and the feature element; and Step 104: inserting the reconstructed image frame between the two adjacent frames of the original images.

Herein, it can be understood by those skilled in the art that acquiring the two adjacent frames of the original images from the video image data stream is merely an illustrative example. Also, according to actual needs, original images of three, four, five or more adjacent frames may be acquired from the video image data for subsequent processes of steps 102 to 104, and the present disclosure is not limited thereto.

In the present embodiment, for example, the two adjacent frames of the original images are acquired from the video image data stream, the feature element that produces smear is extracted from the two adjacent frames of the original images by processing with algorithms, and then the two adjacent frames of the original images and the feature element are used together to generate the reconstructed image frame that is ultimately inserted between the two adjacent frames of the original images. Accordingly, the present embodiment can effectively improve the smear and blurring of the TFT-LCD and minimize the brightness loss by performing a process of frequency doubling and frame insertion on video images. Algorithms of inverse filtering and motion estimation and compensation frame insertion generally involve complicated processes such as sampling, quantization, correction, Fourier transform, correction and display. In contrast, the present embodiment involves algorithms that are easier to implement, which contributes to data bandwidth saving. In addition, the inverse filtering algorithm generally causes problems such as noise and image flickering, while the technical solution of the present embodiment will not produce those problems in the process of generating the reconstructed image frame. Furthermore, as compared with blacking for backlight and backlight scanning, the technical solution of the present embodiment is simpler in hardware implementation since only a corresponding image processing circuit is required to be added to the driving circuit of the display device without having to change the existing LCD display and the backlight system, thereby leading to low cost.

In addition, the technical solution of the present embodiment can effectively reduce the brightness loss of the LCD and improve energy utilization efficiency as compared with blacking for backlight and black frame insertion for displaying. For example, if a duty cycle of a pulse square wave for black frame insertion is 50%, more than half of brightness of the LCD will be lost and energy utilization efficiency will be reduced by half, which means that the backlight brightness needs to be doubled to maintain the same brightness. In contrast, in the process of generating the reconstructed image frame in the technical solution of the present embodiment, only the feature element that produces smear is extracted from the two adjacent frames of the original images and rejected in the data of the reconstructed image frame, which is equivalent to performing black frame insertion in a local region (where the smear is produced) with the rest remaining unchanged. In this way, the brightness loss is minimized and the energy utilization efficiency is improved.

Further, prior to the extracting the feature element that produces the smear from the two adjacent frames of the original images, the method further includes performing a sharpening and filtering process on the two adjacent frames of the original images. If there is a fast moving object in an image of one frame, its moving trajectory and contour will be blurred. Specifically, if there is a fast moving object in an image of one frame, high-frequency components will be less than low-frequency components in a frequency domain which is a blurred region. The sharpening and filtering process is performed for the purpose of compensating the contour of the image and enhancing edges and a gray-level jump portion of the image, and the low-frequency components of the blurred region are filtered so that other subsequent operations can be performed.

Further, the extracting the feature element that produces the smear from the two adjacent frames of the original images includes: performing two subtraction logic operations on an original image of a preceding frame $F_{(n-1)}$ and an original image of a subsequent frame $F_{(n+1)}$ by subtracting one from the other to obtain $F_{(a)}$ and $F_{(b)}$, respectively; performing a logic operation of adding $F_{(a)}$ and $F_{(b)}$ to obtain $F_{(c)}$; and performing morphological dilation and erosion operation processes on $F_{(c)}$ to obtain the feature element $F'_{(n)}$ which produces the smear.

Among them, the feature element that produces the smear includes a moving object and its moving trajectory. Dilation and erosion operations are the basis of morphological image processing. In essence, dilation is an operation of "widening" or "thickening" an object in an image, and erosion is an operation of "shrinking" or "thinning" an object in the image. Specifically, a moving trajectory of an object can be regarded as a position of the object as a moving element, which is at the smallest separation distance from a reference position of the moving element, and performing the dilation operation on $F_{(c)}$ can be regarded as connecting two separate moving elements in the position and the reference position in the image from the nearest positions, that is, connecting the moving object and the moving trajectory of the object. In addition, many gaps may be introduced in the process of performing the dilation operation on the image, and these gaps may be filled by an erosion operation. After the above operations are completed, the feature element $F'_{(n)}$ that is finally expected to be extracted may be obtained.

Further, the generating the reconstructed image frame by using the two adjacent frames of the original images and the feature element includes: performing a logic operation of subtracting $F'_{(n)}$ from $F_{(n-1)}$ to obtain $F'_{(n-1)}$; performing a logic operation of subtracting $F'_{(n)}$ from $F_{(n+1)}$ to obtain $F'_{(n+1)}$; and comparing data of $F'_{(n-1)}$ with that of $F'_{(n+1)}$ to obtain a reconstructed image frame $F_{(n)}$.

Further, the comparing the data of $F'_{(n-1)}$ with that of $F'_{(n+1)}$ to obtain the reconstructed image frame $F_{(n)}$ includes comparing brightness of each pixel in $F'_{(n-1)}$ with that of each corresponding pixel in $F'_{(n+1)}$, to retain data of the pixels with low brightness and remove data of the pixels with high brightness; and generating the reconstructed image frame $F_{(n)}$ by using the retained data of the pixels.

Herein, it can be understood by those skilled in the art that retaining the data of the pixels with the low brightness helps to improve the smoothness of the images and reduce the smear while enabling the reduction of the power consumption of the display device. After comparing the images of the two processed frames, $F'_{(n-1)}$ and $F'_{(n+1)}$, with the two frames of the original images, it has been found that the moving object and the object moving trajectory in the original images that cause the smear have been rejected in the reconstructed image frame, and regions where they are located are black in an actual display with the other regions consistent with those in the original images. Therefore, this is equivalent to performing a black frame insertion process on the moving object and its moving trajectory which are in local regions in the display process, and will not cause great loss of the overall picture brightness. After performing the frequency doubling process on the video image data stream, the reconstructed image frame is inserted between the two adjacent frames of the original images. In this way, it is possible to reduce the display afterglow effect in a high-refresh-rate state.

Figure 2:
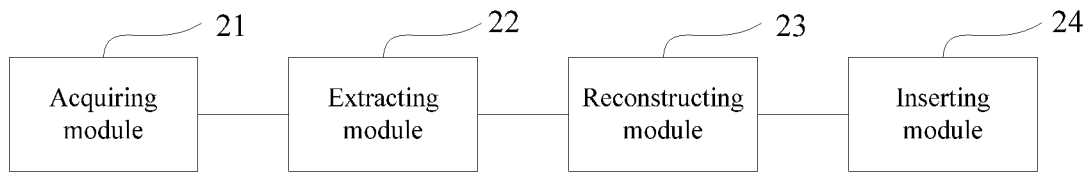
FIG. 2 is a block diagram showing a structure of an image processing apparatus according to an embodiment of the present disclosure.
Figure 3:
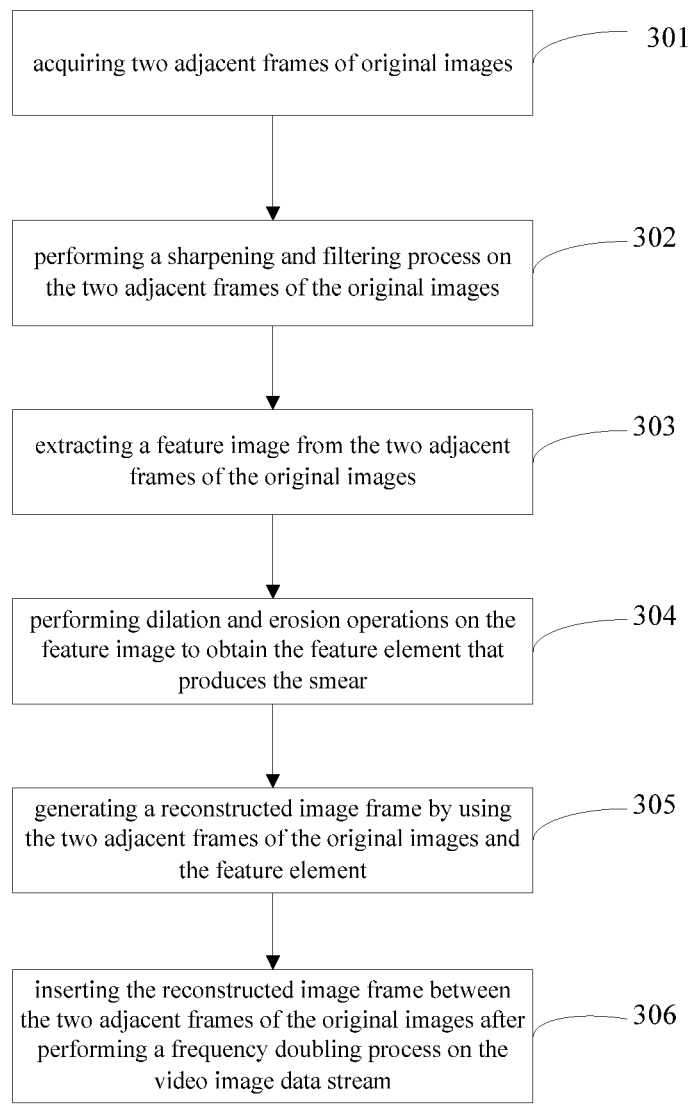
FIG. 3 is a schematic diagram showing a flow chart of an image processing method according to a specific embodiment of the present disclosure.

The embodiments of the present disclosure further provide an image processing apparatus as shown in FIG. 2, which includes an acquiring module 21 configured to acquire two adjacent frames of original images from a video image data stream; an extracting module 22 configured to extract a feature element that produces smear from the two adjacent frames of the original images; a reconstructing module 23 configured to generate a reconstructed image frame that does not include the feature element by using the two adjacent frames of the original images and the feature element; and an inserting module 24 configured to insert the reconstructed image frame between the two adjacent frames of the original images.

Herein, it can be understood by those skilled in the art that acquiring the two adjacent frames of the original images from the video image data stream is merely an illustrative example. Also, according to actual needs, original images of three, four, five or more adjacent frames may be acquired from the video image data for subsequent processes of steps 102 to 104, and the present disclosure is not limited thereto.

In the present embodiment, for example, the two adjacent frames of the original images are acquired from the video image data stream, the feature element that produces the smear is extracted from the two adjacent frames of the original images by processing with algorithms, and then the two adjacent frames of the original images and the feature element are used together to generate the reconstructed image frame that is ultimately inserted between the two adjacent frames of the original images. Accordingly, the present embodiment can effectively improve the smear and blurring of the TFT-LCD and minimize the brightness loss by performing a process of frequency doubling and frame insertion on video images. Algorithms of inverse filtering and motion estimation and compensation frame insertion generally involve complicated processes such as sampling, quantization, correction, Fourier transform, correction and display. In contrast, the present embodiment involves algorithms that are easier to implement, which contributes to data bandwidth saving. In addition, the inverse filtering algorithm generally causes problems such as noise and image flickering, while the technical solution of the present embodiment will not produce those problems in the process of generating the reconstructed image frame. Furthermore, as compared with blacking for backlight and backlight scanning, the technical solution of the present embodiment is simpler in hardware implementation since only a corresponding image processing circuit is required to be added to the driving circuit of the display device without having to change the existing LCD display and the backlight system, thereby leading to low cost.

Further, the image processing apparatus includes a pre-processing module configured to perform a sharpening and filtering process on the two adjacent frames of the original images prior to extracting the feature element that produces the smear from the two adjacent frames of the original images. If there is a fast moving object in an image of one frame, its moving trajectory and contour will be blurred. Specifically, if there is a fast moving object in an image of one frame, high-frequency components will be less than low-frequency components in a frequency domain which is a blurred region. The sharpening and filtering process is performed for the purpose of compensating the contour of the image and enhancing edges and a gray-level jump portion of the image, and the low-frequency components of the blurred region are filtered so that other subsequent operations can be performed.

Further, the extracting module 22 is specifically configured to perform two subtraction logic operations on an original image of a preceding frame $F_{(n-1)}$ and an original image of a subsequent frame $F_{(n+1)}$ by subtracting one from the other to obtain $F_{(a)}$ and $F_{(b)}$, respectively; to perform a logic operation of adding $F_{(a)}$ and $F_{(b)}$ to obtain $F_{(c)}$; and to perform morphological dilation and erosion operation processes on $F_{(c)}$ to obtain the feature element $F'_{(n)}$ which produces the smear.

Among them, the feature element that produces the smear includes a moving object and its moving trajectory. Dilation and erosion operations are the basis of morphological image processing. In essence, dilation is an operation of "widening" or "thickening" an object in an image, and erosion is an operation of "shrinking" or "thinning" an object in the image. Specifically, a moving trajectory of an object can be regarded as a position of the object as a moving element, which is at the smallest separation distance from a reference position of the moving element, and performing the dilation operation on $F_{(c)}$ can be regarded as connecting two separate moving elements in the position and the reference position in the image from the nearest positions, that is, connecting the moving object and the moving trajectory of the object. In addition, many gaps may be introduced in the process of performing the dilation operation on the image, and these gaps may be filled by an erosion operation. After the above operations are completed, the feature element $F'_{(n)}$ that is finally expected to be extracted may be obtained.

Further, the reconstructing module 23 includes a logic operation unit configured to perform a logic operation of subtracting $F'_{(n)}$ from $F_{(n-1)}$ to obtain $F'_{(n-1)}$ and to perform a logic operation of subtracting $F'_{(n)}$ from $F_{(n+1)}$ to obtain $F'_{(n+1)}$; and a comparing unit configured to compare data of $F'_{(n-1)}$ with that of $F'_{(n+1)}$ to obtain the reconstructed image frame $F_{(n)}$.

Further, the comparing unit is specifically configured to compare brightness of each pixel in $F'_{(n-1)}$ with that of each corresponding pixel in $F'_{(n+1)}$ to retain data of the pixels with low brightness and remove data of the pixels with high brightness; and to generate the reconstructed image frame $F_{(n)}$ by using the retained data of the pixels.

Further, the inserting module 24 is specifically configured to insert the reconstructed image frame between the two adjacent frames of the original images after performing a frequency doubling process on the video image data stream.

Here, after comparing the images of the two processed frames, $F'_{(n-1)}$ and $F'_{(n+1)}$, with the original images of the two frames, it has been found that the moving object and the object moving trajectory in the original images that cause the smear have been rejected in the reconstructed image frame, and regions where they are located are black in an actual display with the other regions consistent with those in the original images. Therefore, this is equivalent to performing a black frame insertion process on the moving object and its moving trajectory which are in local regions in the display process, and will not cause great loss of the overall picture brightness. After performing the frequency doubling process on the video image data stream, the reconstructed image frame is inserted between the two adjacent frames of the original images. In this way, it is possible to reduce the display afterglow effect in a high-refresh-rate state.

The image processing method of the present disclosure will be described in detail in conjunction with the drawings and specific embodiments. The image processing method of the present embodiment includes the following steps.

In step 301, two adjacent frames of original images, for example, are acquired. Specifically, in a frame memory of the display device, there is stored a video image data stream, from which two adjacent frames of original images, $F'_{(n-1)}$ and $F'_{(n+1)}$, are read.

In step 302, a sharpening and filtering process is performed on the two adjacent frames of the original images. If there is a fast moving object in an image of one frame, its moving trajectory and contour will be blurred. Specifically, if there is a fast moving object in an image of one frame, high-frequency components will be less than low-frequency components in a frequency domain which is a blurred region. Therefore, it is necessary to perform the sharpening and filtering process in order to compensate the contour of the image and enhance edges and a gray-level jump portion of the image, and the low-frequency components of the blurred region are filtered so that other subsequent operations can be performed.

Figure 4:
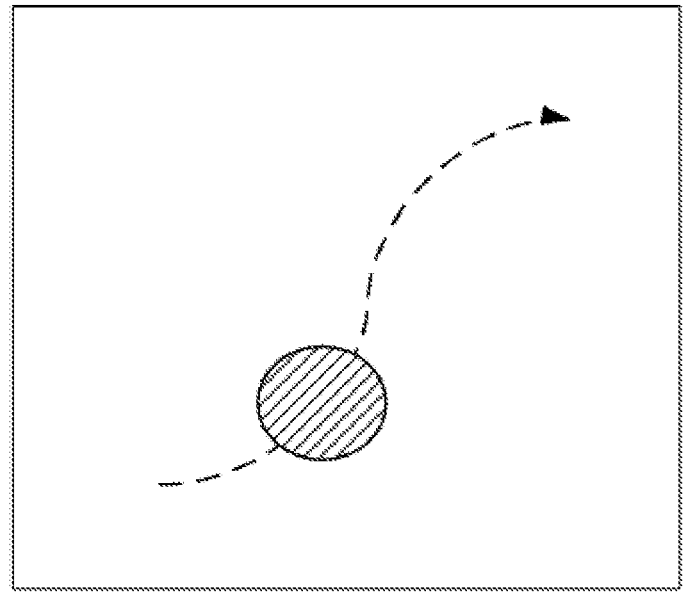
FIGS. 4 to 11 are schematic diagrams of processing an image according to some specific embodiments of the present disclosure.
Figure 5:
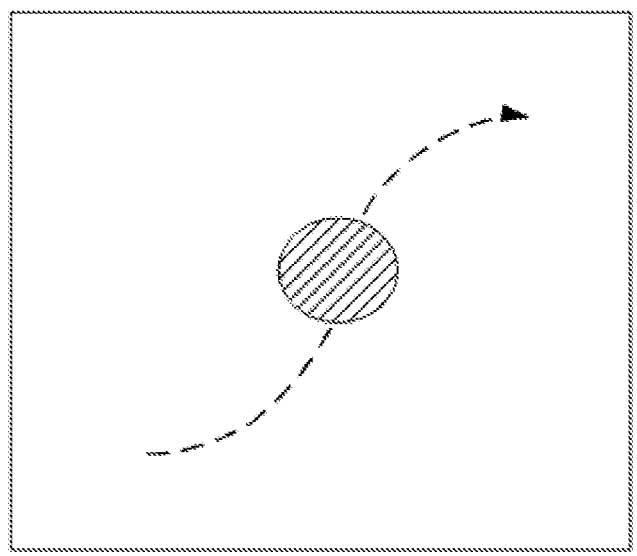

In step 303, a feature image is extracted from the two adjacent frames of the original images. After the sharpening and filtering process of the two adjacent frames of the original images, $F_{(n-1)}$ and $F_{(n+1)}$, it is necessary to extract the image feature of the moving element that produces the smear. FIG. 4 shows an original image of a preceding frame $F_{(n-1)}$, and FIG. 5 shows an original image of a subsequent frame $F_{(n+1)}$. In the original images of the preceding and subsequent frames, a black circle moves along a dotted curve. Since the black circle is a moving element, smear may occur during the playing of the video. In this step, the feature elements that produce the smear in the original images of the two frames, i.e., the moving object and its moving trajectory, are extracted from the original images of the two frames, so that part of them are rejected when an image frame is subsequently reconstructed.

Figure 6:
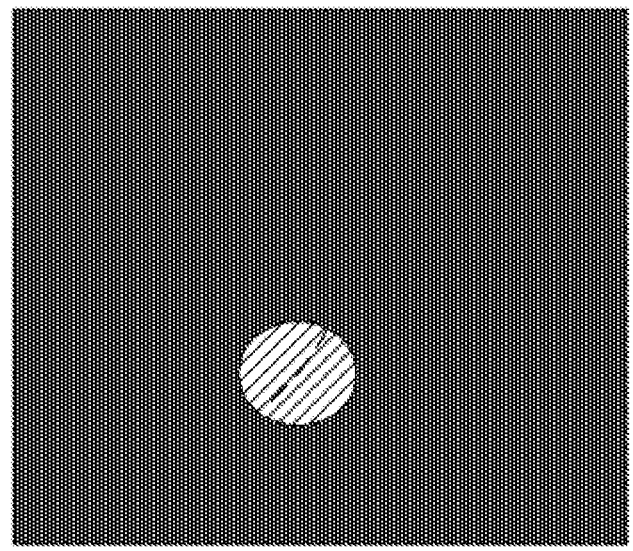
Figure 7:
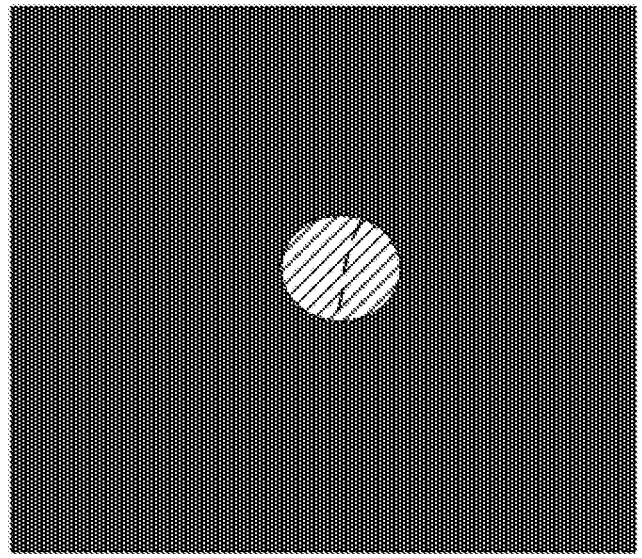
Figure 8:
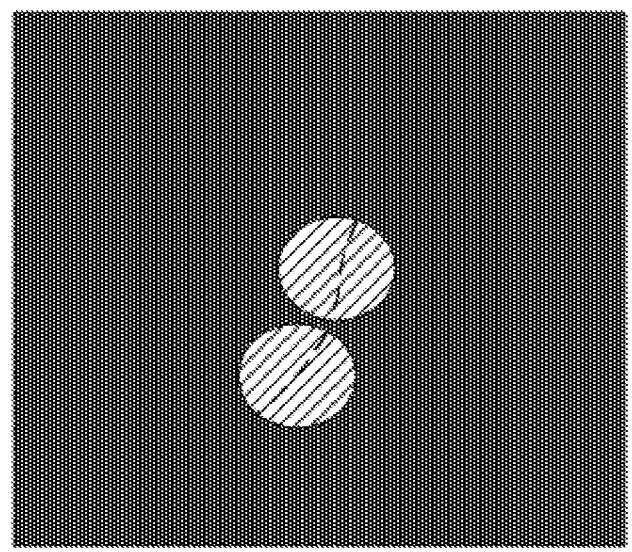

Specific operations are given as follows: performing two subtraction logic operations on $F_{(n-1)}$ and $F_{(n+1)}$ by subtracting one from the other using a morphological image processing method to obtain $F_{(a)}$ and $F_{(b)}$. More specifically, $F_{(n+1)}$ is subtracted from $F_{(n-1)}$ to obtain $F_{(a)}$ as shown in FIG. 6, and $F_{(n-1)}$ is subtracted from $F_{(n+1)}$ to obtain $F_{(b)}$ as shown in FIG. 7. Then, $F_{(a)}$ and $F_{(b)}$ are added by a logic operation to obtain a feature image $F_{(c)}$ as shown in FIG. 8.

Figure 9:
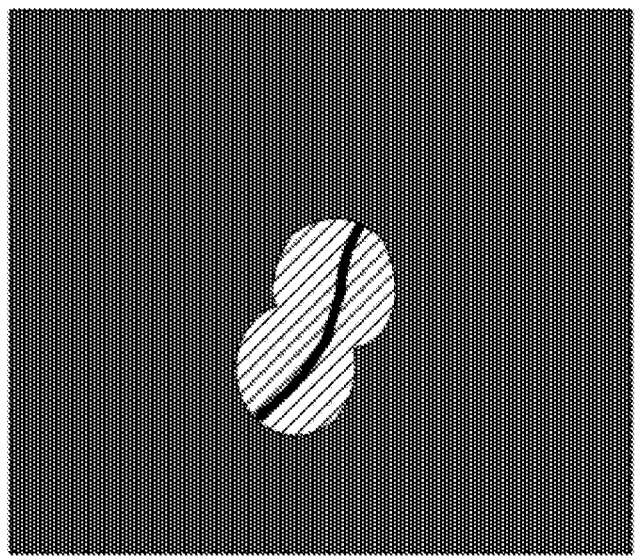

In step 304, dilation and erosion operations are performed on the feature image to obtain the feature element that produces the smear. After the extraction of the feature image in the original images of the two frames is completed, the morphological dilation and erosion operations are performed on $F_{(c)}$ so that the extraction of the feature element (the moving object and its moving trajectory) is completed. Dilation and erosion operations are the basis of morphological image processing. In essence, dilation is an operation of "widening" or "thickening" an object in an image, and erosion is an operation of "shrinking" or "thinning" an object in the image. Specifically, a moving trajectory of an object can be regarded as a position of the object as a moving element, which is at the smallest separation distance from a reference position of the moving element, and performing the dilation operation on $F_{(c)}$ can be regarded as connecting two separate moving elements in the position and the reference position in the image from the nearest positions, that is, connecting the moving object and the moving trajectory of the object. In addition, many gaps may be introduced in the process of performing the dilation operation on the image, and these gaps may be filled by an erosion operation. After the above operations are completed, the feature element $F'_{(n)}$ that is finally expected to be extracted may be obtained, as shown in FIG. 9.

Figure 10:
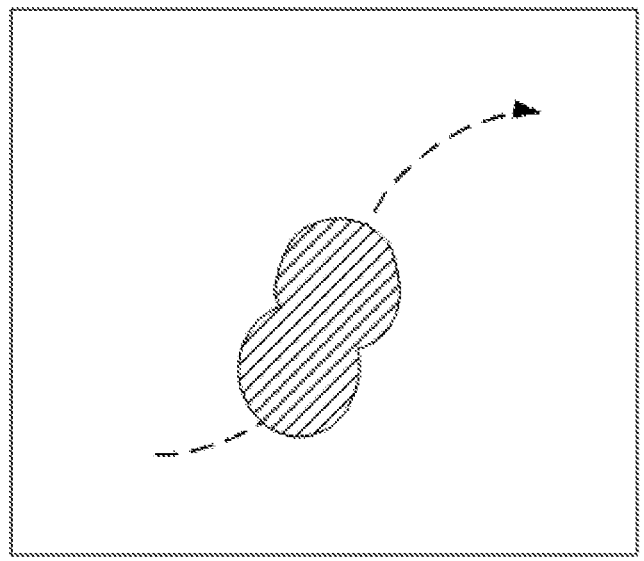
Figure 11:
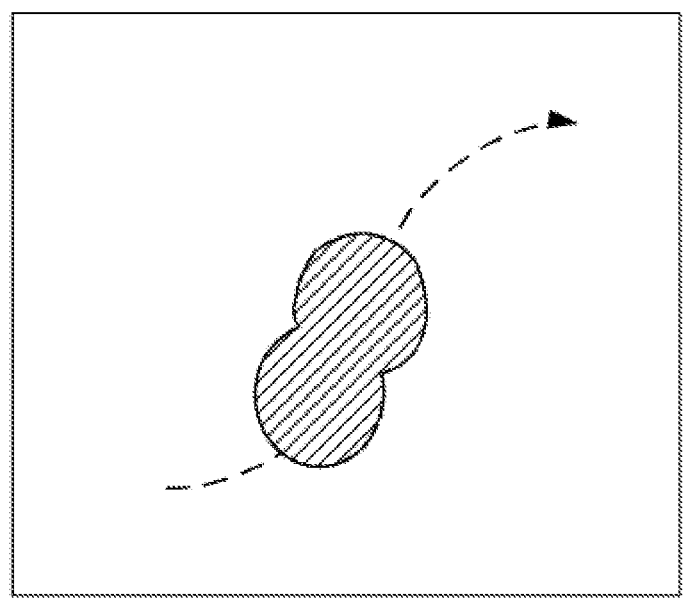

In step 305, a reconstructed image frame is generated by using the two adjacent frames of the original images and the feature element. After the extraction of the feature element $F'_{(n)}$ is completed, the reconstructed image frame may be constructed by using the original images and the extracted feature element $F'_{(n)}$. Specifically, a logic operation of subtracting the feature element $F'_{(n)}$ from the original image $F_{(n-1)}$ is performed to obtain $F''_{(n-1)}$ as shown in FIG. 10, and a logic operation of subtracting the feature element $F'_{(n)}$ from the original image $F_{(n+1)}$ is performed to obtain $F''_{(n+1)}$ as shown in FIG. 11. Then, pixels in $F''_{(n-1)}$ and those in $F''_{(n+1)}$ are compared one by one. Specifically, brightness of each pixel in $F''_{(n-1)}$ is compared with that of each corresponding pixel in $F''_{(n+1)}$ to retain data of the pixels with low brightness and remove data of the pixels with high brightness, and then the retained data of the pixels are used to generate the reconstructed image frame $F_{(n)}$. Retaining the data of the pixels with the low brightness helps to improve the smoothness of the images while enabling the reduction of the power consumption of the display device.

In step 306, the reconstructed image frame is inserted between the two adjacent frames of the original images after a frequency doubling process is performed on the video image data stream.

Figure 12:
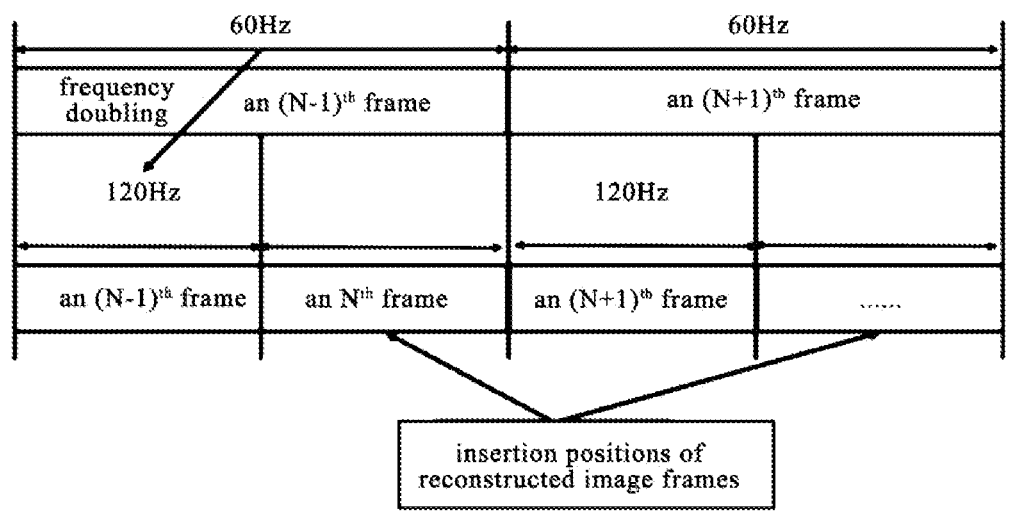
FIG. 12 is a schematic diagram of inserting a reconstructed image frame according to a specific embodiment of the present disclosure.

As shown in FIG. 12, an original refresh frequency of the video image data stream is 60 Hz. Since a new reconstructed image frame needs to be inserted, frequency doubling is first required to be performed on the video image data stream to adjust the refresh frequency of the video image data stream to 120 Hz, and then the reconstructed image frame can be inserted between the two original images of the two adjacent frames. In a specific implementation process, data of the reconstructed image frame $F_{(n)}$ can be sent to a driving chip of the display device for frame insertion and display. After comparing the images of the two processed frames, $F''_{(n-1)}$ and $F''_{(n+1)}$, with the original images of the two frames, it has been found that the moving object and the object moving trajectory in the original images that cause the smear have been rejected in the reconstructed image frame, and regions where they are located are black in an actual display with the other regions consistent with those in the original images. Therefore, this is equivalent to performing a black frame insertion process on the moving object and its moving trajectory which are in local regions in the display process, and will not cause great loss of the overall picture brightness. At the same time, it is possible to reduce the display afterglow effect in a high-refresh-rate state.

The above steps 301-306 illustrate the technical solution of the present embodiment by performing image processing on $F_{(n-1)}$ and $F_{(n+1)}$, and it should be understood that any other two or more adjacent frames in the video image data stream can be processed in a similar manner using the technical solution as described above.

The existing frequency doubling and black frame insertion technology aims to insert a fully black image of one frame between images of every two frames, which causes very great loss of brightness and contrast on the screen. In addition, the motion estimation and compensation technology is difficult in algorithm implementation. As Compared with these two technologies, the technical solution of the present embodiment is simple to implement, and can effectively save data bandwidth and reduce power consumption.

The embodiments of the present disclosure further provide a display device including a memory, a processor, and a computer program stored on the memory and operable on the processor. The processor implements the image processing method as described above when executing the program. The display device may be any product or component having a display function, such as a television, a display, a digital photo frame, a mobile phone, a tablet computer, or the like. The display device further comprises a flexible circuit board, a printed circuit board and a backplane.

Specifically, the display device may be a VR head-mounted device, and with the display device of the present embodiment, the smear and blurring can be effectively improved, and the brightness loss can be minimized.

Specifically, the processor implements the following steps when executing the program: acquiring two adjacent frames of original images from a video image data stream; extracting a feature element that produces smear from the two adjacent frames of the original images; generating a reconstructed image frame that does not include the feature element by using the two adjacent frames of the original images and the feature element; and inserting the reconstructed image frame between the two adjacent frames of the original images.

Further, the processor implements the following step when executing the program: performing a sharpening and filtering process on the two adjacent frames of the original images.

Further, the processor implements the following steps when executing the program: performing two subtraction logic operations on an original image of a preceding frame $F_{(n-1)}$ and an original image of a subsequent frame $F_{(n+1)}$ by subtracting one from the other to obtain $F_{(a)}$ and $F_{(b)}$, respectively; performing a logic operation of adding $F_{(a)}$ and $F_{(b)}$ to obtain $F_{(c)}$; and performing morphological dilation and erosion operation processes on $F_{(c)}$ to obtain the feature element $F'_{(n)}$ which produces the smear.

Further, the processor implements the following steps when executing the program: performing a logic operation of subtracting $F'_{(n)}$ from $F_{(n-1)}$ to obtain $F'_{(n-1)}$; performing a logic operation of subtracting $F'_{(n)}$ from $F_{(n+1)}$ to obtain $F'_{(n+1)}$; and comparing data of $F'_{(n-1)}$ with that of $F'_{(n+1)}$ to obtain a reconstructed image frame $F_{(n)}$.

Further, the processor implements the following steps when executing the program: comparing brightness of each pixel in $F'_{(n-1)}$ with that of each corresponding pixel in $F'_{(n+1)}$ to retain data of the pixels with low brightness and remove data of the pixels with high brightness; and generating the reconstructed image frame $F_{(n)}$ by using the retained data of the pixels.

Further, the processor implements the following step when executing the program: inserting the reconstructed image frame between the two adjacent frames of the original images after performing a frequency doubling process on the video image data stream.

The embodiments of the present disclosure further provide a computer readable storage medium on which a computer program is stored, and the following steps are implemented when the program is executed by a processor.

Specifically, the following steps are implemented when the program is executed by the processor: acquiring two adjacent frames of original images from a video image data stream; extracting a feature element that produces smear from the two adjacent frames of the original images; generating a reconstructed image frame that does not include the feature element by using the two adjacent frames of the original images and the feature element; and inserting the reconstructed image frame between the two adjacent frames of the original images.

Further, the following step is implemented when the program is executed by the processor: performing a sharpening and filtering process on the two adjacent frames of the original images.

Further, the following steps are implemented when the program is executed by the processor: performing two subtraction logic operations on an original image of a preceding frame $F_{(n-1)}$ and an original image of a subsequent frame $F_{(n+1)}$ by subtracting one from the other to obtain $F_{(a)}$ and $F_{(b)}$, respectively; performing a logic operation of adding $F_{(a)}$ and $F_{(b)}$ to obtain $F_{(c)}$; and performing morphological dilation and erosion operation processes on $F_{(c)}$ to obtain the feature element $F'_{(n)}$ which produces the smear.

Further, the following steps are implemented when the program is executed by the processor: performing a logic operation of subtracting $F'_{(n)}$ from $F_{(n-1)}$ to obtain $F'_{(n-1)}$; performing a logic operation of subtracting $F'_{(n)}$ from $F_{(n+1)}$ to obtain $F'_{(n+1)}$; and comparing data of $F'_{(n-1)}$ with that of $F'_{(n+1)}$ to obtain the reconstructed image frame $F_{(n)}$.

Further, the following steps are implemented when the program is executed by the processor: comparing brightness of each pixel in $F'_{(n-1)}$ with that of each corresponding pixel in $F'_{(n+1)}$, to retain data of the pixels with low brightness and remove data of the pixels with high brightness; and generating the reconstructed image frame $F_{(n)}$ by using the retained data of the pixels.

Further, the following step is implemented when the program is executed by the processor: inserting the reconstructed image frame between the two adjacent frames of the original images after performing a frequency doubling process on the video image data stream.

It should be appreciated that, the embodiments described herein may be implemented by hardware, software, firmware, middleware, microcode or a combination thereof. For the hardware implementation, the processor may include one or more of an Application Specific Integrated Circuit (ASIC), a DSP (Digital Signal Processor), a DSP device, a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the technology described in the present disclosure may be implemented through modules capable of achieving the functions in the present disclosure (e.g., processes or functions). Software codes may be stored in the memory and executed by the processor. The memory may be implemented inside or outside the processor.

The various embodiments in the present specification are described in a progressive manner, and each of the embodiments focuses on differences from the other embodiments, and same or similar parts between the various embodiments can be referred to each other.

As will be appreciated by those skilled in the art, embodiments of the present disclosure may be provided as methods, devices, or computer program products. The embodiment of the present disclosure can thus take the form of an entirely hardware embodiment, an entirely software embodiment, or an embodiment containing both hardware and software elements. Furthermore, the embodiment of the present disclosure may take the form of a computer program product which is embodied on one or more computer-usable storage media (including, but not limited to, disk storage, CD-ROM, optical storage, and so forth) having computer-usable program codes embodied therein.

The embodiments of the present disclosure have been described with reference to flow diagrams and/or block diagrams of methods, terminal devices (systems) and computer program products according to embodiments of the disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing terminal device to produce a machine, such that the instructions, which execute via the processor of the computer or other programmable data processing terminal device, create means for implementing the functions specified in the flow diagram flow or flows and/or block diagram block or blocks.

These computer program instructions may also be stored in a computer-readable memory that can direct a computer or other programmable data processing terminal device to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing terminal device to cause a series of operational steps to be performed on the computer or other programmable terminal device to produce a computer implemented process such that the instructions which execute on the computer or other programmable terminal device provide steps for implementing the functions specified in the flow diagram flow or flows and/or block diagram block or blocks.

While preferred embodiments of the present disclosure have been described, additional variations and modifications in those embodiments may occur to those skilled in the art once they learn of the basic inventive concepts. Therefore, it is intended that the appended claims shall be construed to include the preferred embodiments and all such variations and modifications which fall within the scope of the embodiments of the present disclosure.

It should also be noted that, relational terms such as "first" and "second" used herein are used merely to distinguish one entity or operation from another entity or operation, and do not necessarily require or imply any such an actual relation or sequence. Moreover, the terms "comprising", "including" or other variants thereof are intended to be non-exclusive, so that a process, method, article or terminal device that includes a series of elements includes not only these elements but also other elements not expressly listed, or inherent to such a process, method, article or terminal device. An element defined by the phrase "comprising a . . . " without further limitation does not exclude the existence of additional identical elements in the process, method, article or terminal device including the element.

The above are preferred embodiments of the present disclosure, and it should be indicated that several improvements and modifications may be made by those having ordinary skills in the art without departing from the principle of the present disclosure, and such improvements and modifications shall also be regarded as falling within the protection scope of the present disclosure.

What is claimed is:

1. An image processing method, comprising:
   acquiring multiple frames of original images from a video image data stream;
   extracting a feature element that produces smear from the multiple frames of original images;
   generating a reconstructed image frame that does not comprise the feature element by using the multiple frames of original images and the feature element; and
   inserting the reconstructed image frame between two adjacent frames in the multiple frames of original images,
   wherein the extracting the feature element that produces the smear from the multiple frames of original images comprises:
   performing two subtraction logic operations on an original image of a preceding frame $F_{(n-1)}$ and an original image of a subsequent frame $F_{(n+1)}$ by subtracting one from the other to obtain $F_{(a)}$ and $F_{(b)}$, respectively;
   performing a logic operation of adding $F_{(a)}$ and $F_{(b)}$ to obtain $F_{(c)}$; and
   performing morphological dilation and erosion operation processes on $F_{(c)}$ to obtain the feature element $F'_{(n)}$ which produces the smear.

2. The image processing method according to claim 1, wherein the multiple frames of original images are two adjacent frames of original images.

3. The image processing method according to claim 1, wherein the feature element comprises a moving object and its moving trajectory.

4. The image processing method according to claim 1, further comprises:
   performing a sharpening and filtering process on the multiple frames of original images prior to the extracting the feature element that produces the smear from the multiple frames of original images.

5. The image processing method according to claim 1, wherein the dilation operation process is to perform an operation of "widening" or "thickening" in an image, and the erosion operation process is to perform an operation of "shrinking" or "thinning" in the image.

6. The image processing method according to claim 1, wherein the generating the reconstructed image frame that does not comprise the feature element by using the multiple frames of original images and the feature element comprises:
   performing a logic operation of subtracting $F'_{(n)}$ from $F_{(n-1)}$ to obtain $F'_{(n-1)}$;
   performing a logic operation of subtracting $F'_{(n)}$ from $F_{(n+1)}$ to obtain $F'_{(n+1)}$; and
   comparing data of $F'_{(n-1)}$ with that of $F'_{(n+1)}$ to obtain the reconstructed image frame $F_{(n)}$.

7. The image processing method according to claim 6, wherein the comparing the data of $F'_{(n-1)}$ with that of $F'_{(n+1)}$ to obtain the reconstructed image frame $F_{(n)}$ comprises:
   comparing brightness of each pixel in $F'_{(n-1)}$ with that of each corresponding pixel in $F'_{(n+1)}$ to retain data of the pixels with low brightness and remove data of the pixels with high brightness; and
   generating the reconstructed image frame $F_{(n)}$ by using the retained data of the pixels.

8. The image processing method according to claim 1, wherein the inserting the reconstructed image frame between the two adjacent frames in the multiple frames of original images comprises:
   inserting the reconstructed image frame between the two adjacent frames in the multiple frames of original images after performing a frequency doubling process on the video image data stream.

9. A display device, comprising a memory, a processor, and a computer program stored on the memory and operable on the processor; wherein the processor implements an image processing method while executing the program, the image processing method comprising:
   acquiring multiple frames of original images from a video image data stream;

extracting a feature element that produces smear from the multiple frames of original images;

generating a reconstructed image frame that does not comprise the feature element by using the multiple frames of original images and the feature element; and inserting the reconstructed image frame between two adjacent frames in the multiple frames of original images, wherein the extracting the feature element that produces the smear from the multiple frames of original images comprises:

performing two subtraction logic operations on an original image of a preceding frame $F_{(n-1)}$ and an original image of a subsequent frame $F_{(n+1)}$ by subtracting one from the other to obtain $F_{(a)}$ and $F_{(b)}$, respectively;

performing a logic operation of adding $F_{(a)}$ and $F_{(b)}$ to obtain $F_{(c)}$; and performing morphological dilation and erosion operation processes on $F_{(c)}$ to obtain the feature element $F'_{(n)}$ which produces the smear.

10. The display device according to claim 9, wherein the display device is a virtual reality head-mounted device.

11. A non-transitory computer readable storage medium having stored a computer program thereon, wherein steps in the image processing method according to claim 1 are implemented when the program is executed by a processor.

12. The display device according to claim 9, wherein the multiple frames of original images are two adjacent frames of original images.

13. The display device according to claim 9, wherein the feature element comprises a moving object and its moving trajectory.

14. The display device according to claim 9, wherein the processor is configured to further implement:

performing a sharpening and filtering process on the multiple frames of original images prior to the extracting the feature element that produces the smear from the multiple frames of original images.

15. The display device according to claim 9, wherein the dilation operation process is to perform an operation of "widening" or "thickening" in an image, and the erosion operation process is to perform an operation of "shrinking" or "thinning" in the image.

16. The display device according to claim 9, wherein the generating the reconstructed image frame that does not comprise the feature element by using the multiple frames of original images and the feature element comprises:

performing a logic operation of subtracting $F'_{(n)}$ from $F_{(n-1)}$ to obtain $F'_{(n-1)}$;

performing a logic operation of subtracting $F'_{(n)}$ from $F_{(n+1)}$ to obtain $F'_{(n+1)}$; and comparing data of $F'_{(n-1)}$ with that of $F'_{(n+1)}$ to obtain the reconstructed image frame $F_{(n)}$.

17. The display device according to claim 16, wherein the comparing the data of $F'_{(n-1)}$ with that of $F'_{(n+1)}$ to obtain the reconstructed image frame $F_{(n)}$ comprises:

comparing brightness of each pixel in $F'_{(n-1)}$ with that of each corresponding pixel in $F'_{(n+1)}$ to retain data of the pixels with low brightness and remove data of the pixels with high brightness; and generating the reconstructed image frame $F_{(n)}$ by using the retained data of the pixels.

18. The display device according to claim 9, wherein the inserting the reconstructed image frame between the two adjacent frames in the multiple frames of original images comprises:

inserting the reconstructed image frame between the two adjacent frames in the multiple frames of original images after performing a frequency doubling process on the video image data stream.

\* \* \* \* \*